(12) United States Patent
Tan et al.

(10) Patent No.: US 6,950,894 B2
(45) Date of Patent: Sep. 27, 2005

(54) TECHNIQUES USING INTEGRATED CIRCUIT CHIP CAPABLE OF BEING COUPLED TO STORAGE SYSTEM

(75) Inventors: Loo Shing Tan, Penang (MY); King Heng Lock, Penang (MY); Soon Chieh Lim, Penang (MY)

(73) Assignee: Intel Corporation, Santa Clara, CA (US)

( * ) Notice: Subject to any disclaimer, the term of this patent is extended or adjusted under 35 U.S.C. 154(b) by 502 days.

(21) Appl. No.: 10/233,101

(22) Filed: Aug. 28, 2002

(65) Prior Publication Data

US 2004/0044815 A1 Mar. 4, 2004

(51) Int. Cl.[7] .................................... G06F 13/00
(52) U.S. Cl. ....................... 710/300; 711/115; 714/7
(58) Field of Search .................. 710/300–304, 710/52, 63, 74, 313; 713/300; 711/115, 104, 111; 714/7; 361/684, 695, 721, 736

(56) References Cited

U.S. PATENT DOCUMENTS

| | | | |
|---|---|---|---|
| 4,084,230 A | * | 4/1978 | Matick ........................... 711/5 |
| 4,870,643 A | | 9/1989 | Bultman et al. |
| 5,088,081 A | | 2/1992 | Farr |
| 5,191,584 A | | 3/1993 | Anderson |
| 5,367,669 A | | 11/1994 | Holland et al. |
| 5,497,464 A | * | 3/1996 | Yeh ............................ 710/303 |
| 5,522,049 A | * | 5/1996 | Kimura et al. .............. 710/301 |
| 5,666,495 A | * | 9/1997 | Yeh ............................ 710/303 |
| 5,761,460 A | | 6/1998 | Santos et al. |
| 5,986,889 A | | 11/1999 | Chang |
| 6,098,114 A | * | 8/2000 | McDonald et al. ............. 710/5 |
| 6,122,750 A | | 9/2000 | Hayasaka |
| 6,137,679 A | | 10/2000 | Chang |
| 6,349,353 B1 | * | 2/2002 | Lewis et al. ............... 710/300 |
| 6,370,604 B1 | | 4/2002 | Sreekanti |
| 6,768,222 B1 | * | 7/2004 | Ricks ........................... 307/32 |

OTHER PUBLICATIONS

"A 250 MHZ dual port cursor RAM using dynamic data alignment architecture" by Nakase, Y.; Kono, H.; Tokuda, T. (abstract only) Publication Date: May 5–8, 1997.*

Intel Corp., Product Brief, Intel Pentium 4 Processor–based Platform with the Intel 850 chipset Family, 2002.

Intel Corp., Low Pin Conut (LPC) Interface Specification, Rev. 1.0, Sep. 29, 1997.

Intel Corp., Intel 82801BA I/O Controller Hub 2 (ICH2) and Intel 82801 BAM I/O Controller Hub 2 Mobile (ICH2–M), datasheet, Oct. 2000.

Intel Corp., Intel 850 Chipset Family: Intel 82850/82850E Memory Controller Hub (MCH), Datasheet, May 2002.

Intel Corp., Intel 850 Chipset Family: Intel 82850/82850E Memory Controller Hub (MCH), Specification Update, May 2002.

Intel Corp., Intel 82801BA I/O Controller Hub 2 (ICH2) and Intel 82801 BAM I/O Controller Hub 2 Mobile (ICH2–M), Specification Update, Jul. 2002.

(Continued)

*Primary Examiner*—Gopal C. Ray
(74) *Attorney, Agent, or Firm*—Christopher K. Gagne

(57) ABSTRACT

In one embodiment, a method is provided in which an integrated circuit that includes an integrated input/output (I/O) controller is coupled to a storage system. The integrated circuit is coupled to a host processor system bus via a dedicated communication path. The storage system is capable of being coupled to and de-coupled from at least one removable storage device, and of receiving from the integrated circuit, when the storage system is coupled to the integrated circuit, data and/or an I/O request. The method of the embodiment also includes coupling or de-coupling the at least one removable storage device to or from, respectively, the storage system. The storage system remains capable of receiving from the integrated circuit the data and/or I/O request while the at least one removable storage device is being coupled to or de-coupled from the storage system.

28 Claims, 3 Drawing Sheets

OTHER PUBLICATIONS

Promise Technology Inc., Product Launch, Ultra Trak SX & RM Series, Server–class, SCSI–to–Ultra ATA RAID External &–Rackmount Subsystems, 2002.

Promise Technology Inc., ATA RAID 0, 1 Network Attached Storage, Connector II.

Promise Technology Inc., Super Swap.

Promise Technology Inc., Powered by Promise ATA RAIF, SuperTrak SX6000.

Promise Technology Inc., Ultra ATA/133 Hot Swap Drive Enclosre, SuperSwap 1000.

Promise Technology Inc., UltraATA/100 Controller for 66MHz PCI Motherboards, Ultra100 TX2.

Promise Technology Inc., Ultra ATA/133 Controller for 66MHz PCI, Ultra 133 TX2.

Promise Technology Inc., SCSI–to–ATA RAID External Subsystems, UnltraTrak SX & RM Series Subsystems.

Promise Technology Inc., 2–Channel Ultra ATA/100 RAID Controller and Hot Swap Subsystem, FastTrak 100 TX2.

Promise Technology Inc., Ultra ATA/133 RAID 0, 1 and 0+1 Controller, FastTrak TX 2000.

USB Engineering Change Notice, Pull–up/pull–down resistors, Universal Serial Bus Specification Revision 2.0.

Errata for "USB Revision 2.0 Apr. 27, 2000" as of Dec. 7, 2000.

Errata for "USB Revision 2.0 Apr. 27, 2000" as of May 28, 2002.

Peter T. McLean, Maxtor, Corp., Information Technology—AT Attachment with Packet Interface—5 (ATA/ATAPI–5), working draft, Rev. 3, Feb. 29, 2000.

American National Standard for Information Technology—AT Attachment with Packet Interface –5 (ATA/ATAPI–5), developed by Incits, Dec. 13, 2000.

* cited by examiner

TECHNIQUES USING INTEGRATED CIRCUIT CHIP CAPABLE OF BEING COUPLED TO STORAGE SYSTEM

FIELD

This disclosure relates to the field of storage replacement.

BACKGROUND

One conventional data storage system includes a mass storage system coupled to a host system. Typically, the mass storage system includes a plurality of disk storage devices and a mechanism that permits a malfunctioning disk storage device to be removed from, and replaced in the mass storage system with a replacement disk storage device, while the mass storage system remains able to receive input/output (I/O) requests from the host system.

Typically, the mass storage system is coupled to and controlled by an I/O controller that is comprised in a circuit card. This card may be coupled, via an I/O bus card slot in the host system, to a shared I/O bus comprised in the host system. The card also may be allocated a set of I/O bus addresses. Using the shared I/O bus, the card may exchange data and/or commands with other I/O devices coupled to the I/O bus. In the host system, the total number of I/O bus slots, the total pool of I/O bus addresses, and the maximum I/O bus bandwidth may be limited.

BRIEF DESCRIPTION OF THE DRAWINGS

Features and advantages of embodiments of the claimed subject matter will become apparent as the following Detailed Description proceeds, and upon reference to the Drawings, wherein like numerals depict like parts, and in which:

Although the following Detailed Description will proceed with reference being made to illustrative embodiments, many alternatives, modifications, and variations thereof will be apparent to those skilled in the art. Accordingly, it is intended that the claimed subject matter be viewed broadly, and be defined only as set forth in the accompanying claims.

DETAILED DESCRIPTION

Figure 1:
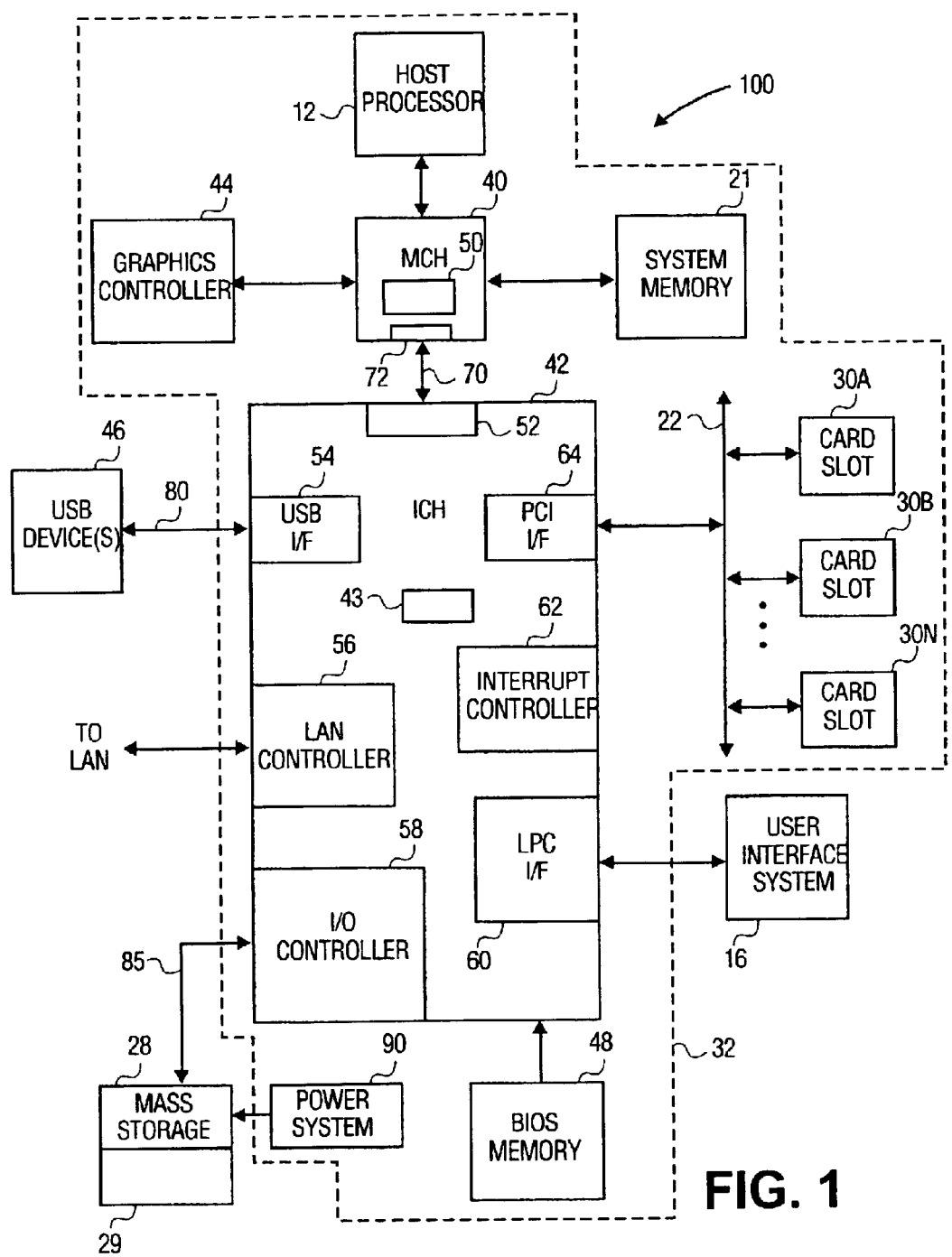
FIG. 1 is a diagram illustrating a system embodiment.

FIG. 1 illustrates a system embodiment 100 of the claimed subject matter. System 100 may include a host processor 12 coupled to a memory controller hub (MCH) 40. Host processor 12 may comprise, for example, an Intel® Pentium® III or IV microprocessor that is commercially available from the Assignee of the subject application. Of course, alternatively, host processor 12 may comprise another type of microprocessor, such as, for example, a microprocessor that is manufactured and/or commercially available from a source other than the Assignee of the subject application, without departing from this embodiment.

MCH 40 may comprise, for example, an integrated circuit (IC), such as, e.g., an Intel® 82850 or 82850E MCH IC chip that is commercially available from the Assignee of the subject application. As used herein, an IC is or comprises a semiconductor device and/or microelectronic device, such as, for example, a semiconductor IC chip. Of course, MCH 40 may comprise another type of IC, such as, for example, an IC that is manufactured and/or commercially available from a source other than the Assignee of the subject application, without departing from this embodiment.

MCH 40 may comprise a host processor bridge, host processor hub, and/or host processor system bus 50 that may couple host processor 12, a system memory 21, a graphics controller 44, and an I/O controller hub (ICH) 42 to each other. MCH 40 may include an interface 72 that may be coupled to an interface 52 in ICH 42 via a signal path 70. Path 70 may comprise a dedicated communication path between ICH 42 and MCH 40. As used herein, a dedicated communication path comprises a point-to-point communications link between two devices that is not shared with additional devices. In this embodiment, the dedicated communication path that may be comprised in path 70 may permit communication exclusively between ICH 42 and host processor bridge, host processor hub, and/or host processor system bus 50 in MCH 40. As used herein, a "host processor system bus" comprises a bus that is used to couple a host processor to one or more other devices, such as, for example, system memory 21. Also as used herein, a "bus" comprises one or more communications media that may be coupled to a plurality of devices and via which two or more of such devices may exchange data and/or commands among themselves.

ICH 42 may be or comprise, for example, an IC, such as, e.g., Intel® 82801BA I/O Controller Hub 2 IC chip that is commercially available from the Assignee of the subject application. Of course, ICH 42 may comprise another type of IC, such as, for example, an IC that is manufactured and/or commercially available from a source other than the Assignee of the subject application, without departing from this embodiment.

ICH 42 may comprise an integrated interface 60 that may be used to couple ICH 42 to a user interface system 16. Although not shown in the Figures, graphics controller 44 may also be coupled to user interface system 16, and user interface system 16 may comprise, e.g., a keyboard, pointing device, and display system that may permit a human user to input commands to, and monitor the operation of, system 100. LPC interface 60 may be compatible and/or comply with, and/or may exchange data and/or commands with user interface system 16 in accordance with a protocol that may be compatible and/or comply with, the Low Pin Count Interface Specification, revision 1.0, published 1997 by Intel Corporation. Of course, ICH 42 may exchange data and/or commands with user interface system 16 using another protocol without departing from this embodiment.

ICH 42 also may comprise an integrated local area network (LAN) controller 56 that may be coupled to an LAN (not shown). ICH 42 may utilize controller 56 to exchange data and/or commands with the LAN. Controller 56 may exchange such commands and/or data with LAN in accordance with an Ethernet protocol that may comply and/or be compatible with the protocol described in Institute of Electrical and Electronics Engineers, Inc. (IEEE) Std. 802.3, 2000 Edition, published on Oct. 20, 2000. Of course, controller 56 may exchange such commands and/or data with LAN using another protocol, without departing from this embodiment.

Additionally, ICH 42 may include an integrated universal serial bus (USB) interface 54 that may be coupled via one or more, and in this embodiment, a plurality of universal serial buses 80 to one or more USB devices 46. USB interface 54 may be compatible and/or comply with, and/or may exchange data and/or commands with one or more devices 46 in accordance with, a protocol that may be compatible and/or comply with, Universal Serial Bus Specification 2.0, published 2000 by Compaq Computer Corporation, Hewlett-Packard Company, Intel Corporation, Lucent Technologies Inc, Microsoft Corporation, NEC Corporation, and Koninklijke Philips Electronics N.V.

ICH 42 also may include an integrated bus interface 64 that may be coupled via a bus system 22 to a plurality of bus interface circuit card slots 30A, 30B, . . . 30N. Slots 30A, 30B, . . . 30N may be constructed to receive and become electrically and mechanically mated with respective circuit cards (not shown). When these circuit cards are so mated with slots 30A, 30B, . . . 30N, ICH 42 may exchange data and/or commands with these circuit cards via PCI interface 64, bus 22, and slots 30A, 30B, . . . 30N. Bus system 22 may be compatible and/or comply with Peripheral Component Interconnect (PCI) Local Bus Specification, Revision 2.2, Dec. 18, 1998 available from the PCI Special Interest Group, Portland, Oreg., U.S.A. (hereinafter referred to as a "PCI bus"). Of course, alternatively, bus 22 may comprise another type of bus, without departing from this embodiment of the claimed subject matter.

ICH 42 may also comprise an integrated interrupt controller 62. Although not shown in the Figures, interrupt controller 62 may be coupled via interrupt signal lines (not shown) to various other components in system 100. Interrupt controller 62 may process interrupts that it may receive via these interrupt signal lines from these components in system 100.

Additionally, ICH 42 may comprise integrated I/O controller 58. I/O controller 58 may utilize controller 58 to exchange data and/or commands with a mass storage 28 via an at least one, and in this embodiment, a plurality of communication links 85. Controller 58 may exchange such commands and/or data with mass storage 28 in accordance with a protocol that may comply and/or be compatible with the protocol described in Information Technology—AT Attachment with Packet Interface-5 (ATA/ATAPI-5), published 2000 by American National Standards Institute (hereinafter, "ATA standard"). By exchanging such commands and/or data with mass storage 28, controller 58 may control and/or monitor the operation of mass storage 28. Of course, alternatively, I/O controller 58 may exchange data and/or commands with mass storage 28 using another communication protocol, without departing from this embodiment of the claimed subject matter.

Basic input/output system (BIOS) memory 48 may be coupled to ICH 42, and instruction memory 43. Memory 48 and memory 43 may comprise or store machine-readable program instructions may be accessed and executed by ICH 42. When executed by ICH 42, these instructions may result in ICH 42 performing the operations described herein as being performed by ICH 42.

System 100 also comprises a power system 90 that may be coupled to, and provides actuating electrical power to mass storage 28. Although not shown in the Figures, power system 90 may also be coupled to, and provide actuating electrical power to other components in system 100, such as, for example, memory 48, ICH 42, controller 44, MCH 40, host processor 12, system memory 21, and the circuit cards that may be coupled to card slots 30A, 30B, . . . 30N.

Processor 12, system memory 21, PCI bus 22, MCH 40, ICH 42, power system 90, BIOS memory 48, and circuit card slots 30A, 30B, . . . 30N may be comprised in a single circuit board, such as, for example, a system motherboard 32. Mass storage 28 may be comprised in one or more enclosures that may be separate from the enclosure in which the motherboard 32 and the components comprised in the motherboard 32 are enclosed. Likewise, USB devices 46 may be comprised in one or more enclosures that may be separate from the enclosure in which the motherboard 32 and the components comprised in the motherboard 32 are enclosed. Additionally, user interface system 16 may be comprised in one or more enclosures that may be separate from the enclosure in which the motherboard 32 and the components comprised in the motherboard 32 are enclosed.

Figure 2:
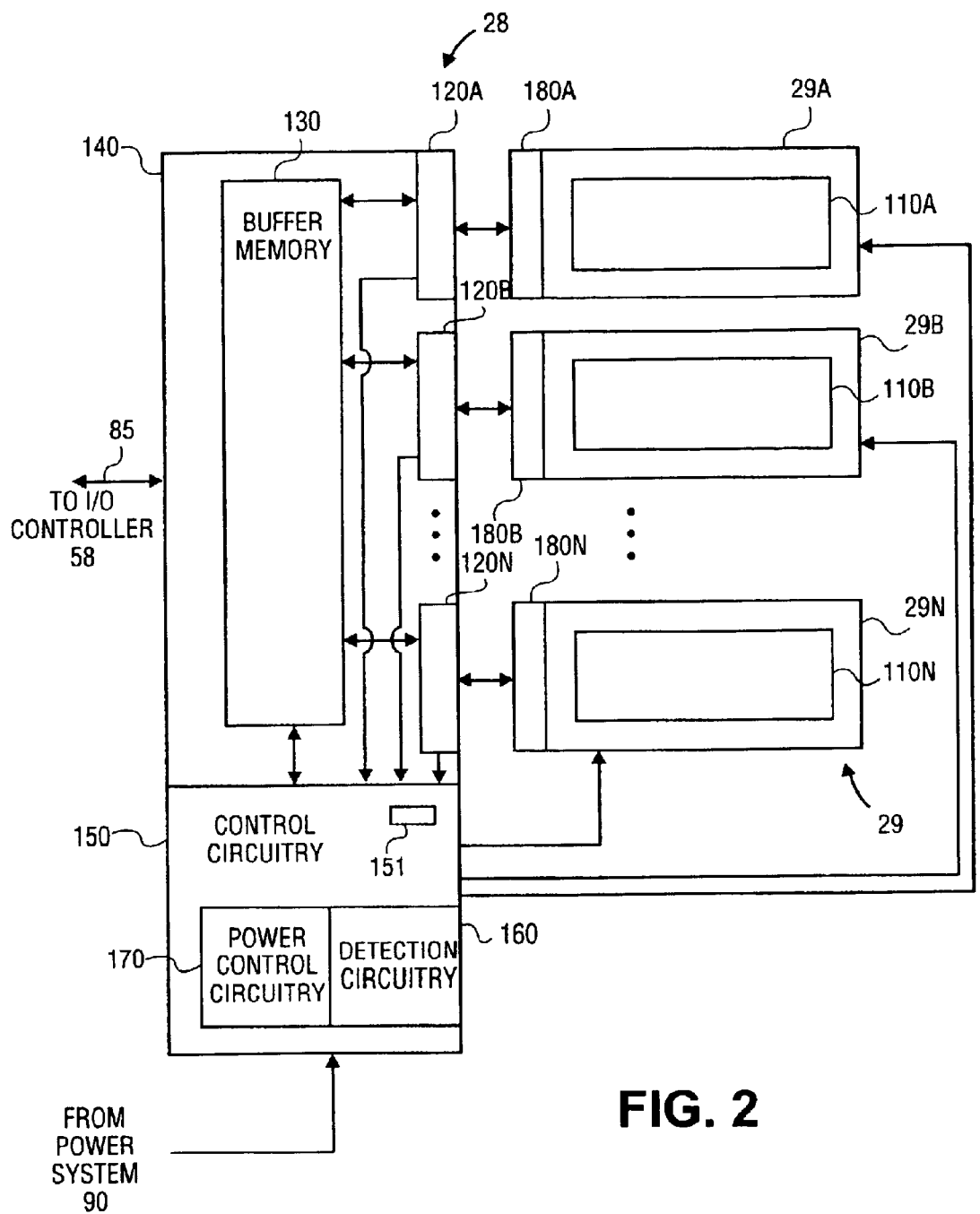
FIG. 2 is a diagram illustrating construction of the mass storage system comprised in the system of FIG. 1.

Turning now to FIG. 2, mass storage 28 may comprise a mass storage system/subsystem that may include an electrical back plane 140. Back plane 140 may be coupled to controller 58 via links 85, and also may be coupled to power system 90. Back plane 140 may include control circuitry 150, buffer memory 130, and a plurality interfaces 120A, 120B, . . . 120N. Control circuitry 150 may comprise instruction memory 151, power control circuitry 170, and mass storage device presence detection circuitry 160. Control circuitry 150 may be coupled to buffer memory 130, interfaces 120A, 120B, . . . 120N, and a plurality of mass storage devices 29A, 29B, . . . 29N that may be comprised in, for example, a redundant array of inexpensive disks (RAID) 29 that may be comprised in mass storage 28. Buffer memory 130 also may be coupled to interfaces 120A, 120B, . . . 120N.

Mass storage devices 29A, 29B, . . . 29N may comprise respective magnetic disk, optical disk, solid-state, and/or semiconductor mass storage devices 110A, 110B, 110N. Additionally, mass storage devices 29A, 29B, . . . 29N may comprise respective interfaces 180A, 180B, . . . 180N that may be constructed to be electrically and mechanically coupled to interfaces 120A, 120B, . . . 120N, respectively. Interfaces 180A, 180B, . . . 180N may also be constructed so as to permit, after mass storage devices 29A, 29B, . . . 29N have been respectively coupled to interfaces 120A, 120B, . . . 120N, each of mass storage devices 29A, 29B, . . . 29N to be separately removable (i.e., so as to be de-coupled) from interfaces 120A, 120B, . . . 120N, respectively. Each respective interface 120A, 120B, . . . 120N in back plane 140 may provide to detection circuitry 160 a respective signal that may indicate whether a respective one of the mass storage devices 29A, 29B, . . . 29N is coupled to the respective interface 120A, 120B, . . . 120N. For example, when interface 180A of device 29A is coupled to interface 120A, interface 120A may provide to detection circuitry 160 a respective signal that may indicate that device 29A is coupled to interface 120A. Also for example, when interface 180A of device 29A is de-coupled from interface 120A, interface 120A may provide to detection circuitry 160 a respective signal that may indicate that mass storage device 29A has been de-coupled from interface 120A and that presently no mass storage device is coupled to interface 120A. Based at least in part upon these respective signals that detection circuitry 160 may receive from interfaces 120A, 120B, . . . 120N, detection circuitry 160 may determine, for each respective interface 120A, 120B, . . . 120N, whether a respective mass storage device 29A, 29B, . . . 29N is coupled to that respective interface 120A, 120B, . . . 120N.

As will be described below, controller 58 may exchange, via links 85 and buffer memory 130, data and/or commands with the mass storage devices comprised in RAID 29 that may be coupled to back plane 140. This may result in, for example, these mass storage devices storing and/or retrieving data in accordance with such commands.

If detection circuitry 160 determines that a respective one (e.g., mass storage device 29A) of the mass storage devices 29A, 29B, . . . 20N is coupled to a respective one (e.g., interface 120A) of the interfaces 120A, 120B, . . . 120N, detection circuitry 160 may signal control circuitry 150. This may result in control circuitry 150 signaling power control circuitry 170 and buffer memory 130. This may result in power control circuitry 170 supplying actuating electrical power from system 90 to that respective mass storage device 29A, and also may result in buffer memory 130 permitting data and/or commands to be exchanged between that mass storage device 29A and controller 58 via buffer memory 130.

Conversely, if detection circuitry 160 determines that a respective one (e.g., mass storage device 29A) of the mass storage devices 29A, 29B, . . . 20N is de-coupled from a respective one (e.g., interface 120A) of the interfaces 120A, 120B, . . . 120N, detection circuitry 160 may signal control circuitry 150. This may result in control circuitry 150 signaling power control circuitry 170 and buffer memory 130. This may result in power control circuitry 170 shutting off the supply actuating electrical power from system 90 to that respective mass storage device 29A, and also may result in disabling of buffer memory 130 from permitting the exchange of data and/or commands between that mass storage device 29A and controller 58. While buffer memory 130 is so disabled, buffer memory 130 may store data and/or commands received from controller 58 that may have been intended to be received by mass storage device 29A.

Memory 151 may comprise or store machine-readable program instructions that may be accessed and executed by control circuitry 150. When executed by control circuitry 150, these instructions may result in control circuitry 150, power control circuitry 170, and detection circuitry 160 performing the operations described herein as being performed by control circuitry 150, power control circuitry 170, and detection circuitry 160, respectively. These and other operations 300 that may be performed in system 100 in accordance with one embodiment will now be described with reference to FIG. 3.

Figure 3:
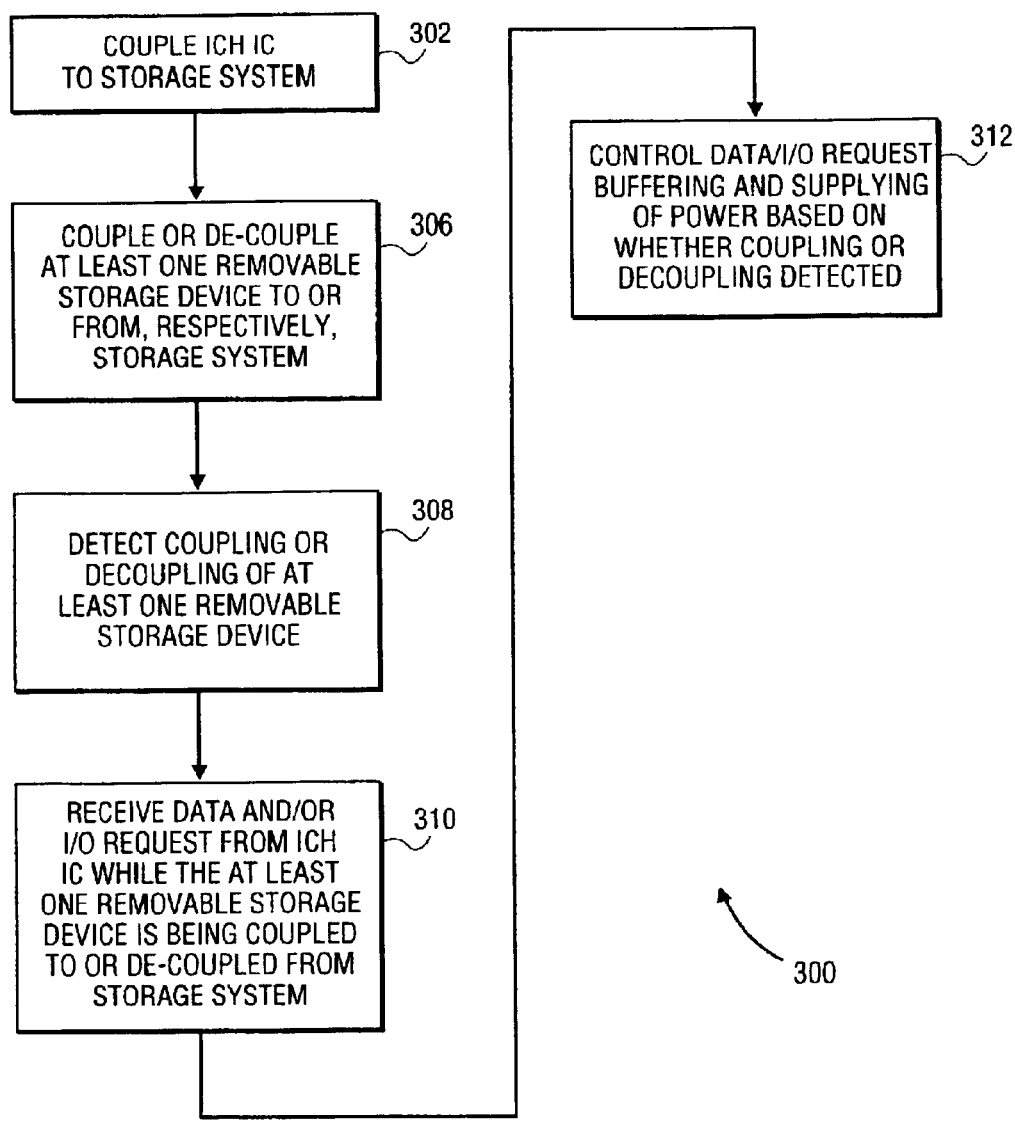
FIG. 3 is a flowchart illustrating operations that may be performed according to one embodiment.

Operations 300 may commence with the coupling of I/O controller 58 of ICH 42 to mass storage 28 via links 85, as illustrated by operation 302 in FIG. 3. Operation 302 may occur, for example, after reset and/or initiation of system 100. Alternatively, depending upon the particular implementation of system 100, such reset and/or initiation may occur after completion of operation 302.

In this embodiment, prior to such reset and initialization of system 100, one or more USB devices 46 may be coupled to USB interface 54 via one or more universal serial buses 80, LAN controller 56 may be coupled via an appropriate network communications medium to a not shown LAN, user interface system 16 may be coupled to LPC interface 60 and to graphics controller 44, and one or more circuit cards (not shown) may be inserted into and coupled to one or more respective card slots 30A, 30B, . . . 30N. This may permit ICH 42 and/or host processor 12 to use conventional discovery techniques to discover, and/or exchange data and/or commands with one or more USB devices 46, the not shown LAN, user interface system 16, and these one or more circuit cards. Also, prior to performing operation 302, power system 90 may be electrically coupled to mass storage 28.

After completion of operation 302, controller 58 may exchange data and/or commands with mass storage devices that may be coupled to back plane 140 and/or control circuitry 150. This may result in controller 58 obtaining information from such mass storage devices and/or control circuitry 150 mass storage device and/or control circuitry configuration information, such as, for example, the present number, types, and/or storage capacities of such mass storage devices, that may permit controller 58 and host processor 12 to be able to control, monitor, and configure mass storage 28. Based, at least in part, upon such information, ICH 42 may signal host processor 12 and/or system memory 21 via path 70 and MCH 40. This may result in system memory 21 and/or host processor 12 assigning one or more configuration spaces (not shown) in memory 21 that may facilitate and/or enable control, monitoring, and configuration of mass storage 28 by ICH 42 and host processor 12.

Thereafter, at least one mass storage device (e.g., mass storage device 29A) that may be coupled to mass storage 28 prior to completion of operation 302 may be decoupled to mass storage 28 after completion of operation 302, and/or at least one mass storage device (e.g., mass storage device 29B) that may not be coupled to mass storage 28 prior to completion of operation 302 may be coupled to mass storage 28 after completion of operation 302, as illustrated by operation 306. For example, mass storage device 29A may be inserted into and coupled to interface 120A prior to completion of operation 302, and after completion of operation 302, mass storage device 29A may be removed and de-coupled from interface 120A. Also for example, mass storage device 29B may not be coupled to interface 120B prior to completion of operation 302, and after completion of operation 302, mass storage device 29B may be inserted into and coupled to interface 120B.

If, as a result of operation 306, mass storage device 29A is de-coupled from interface 120A, and/or mass storage device 29B is coupled to interface 120B, detection circuitry 160 may detect and/or determine, in the manner described previously, that mass storage device 29A has been de-coupled from interface 120A and/or that mass storage device 29B has been coupled to interface 120B, as illustrated by operation 308 in FIG. 3. In response, at least in part, to such determination by detection circuitry 160, circuitry 160 may signal control circuitry 150. This may result in control circuitry 150 signaling power control circuitry 170 and buffer memory 130.

If, as a result of operation 306, mass storage device 29A is de-coupled from interface 120A, this may result in power control circuitry 170 shutting off the supply actuating electrical power from system 90 to mass storage device 29A, and also may result in disabling of buffer memory 130 from permitting the exchange of data and/or commands between mass storage device 29A and controller 58. While buffer memory 130 is so disabled, buffer memory 130 may store data and/or commands received from controller 58 that may have been intended to be received by mass storage device 29A.

Alternatively, or additionally, if, as a result of operation 306, mass storage device 29B is coupled to interface 120B, this signaling by control circuitry 150 of power control circuitry 170 and buffer memory 130 may result in power control circuitry 170 initiating supply of actuating electrical power from system 90 to mass storage device 29B, and also may result in buffer memory 130 being enabled to permit the exchange data and/or commands between mass storage device 29B and controller 58. The data and/or commands exchanged between mass storage device 29A and controller 58 may permit, for example, ICH 42 and/or host processor 12 to control, monitor, and configure mass storage 29B.

For example, while mass storage device 29A is being de-coupled from interface 120A and/or mass storage device 29B is being coupled to interface 120B, host processor 12 may issue an I/O request and/or data to ICH 42 via MCH 40. This may result in controller 58 transmitting to mass storage 28 one or more commands, such as, for example, an I/O request, and/or data that may correspond to the I/O request and/or data issued to ICH 42 by host processor 12. The I/O request transmitted by controller 58 to mass storage 28 may comprise, for example, a request to read data from and/or write data into one or more of the mass storage devices that may have been coupled to back plane 140 prior to completion of operation 302, such as, for example, mass storage device 29A.

While mass storage device 29A is being de-coupled from interface 120A and/or mass storage device 29B is being coupled to interface 120B, mass storage 28 may receive the I/O request and/or data transmitted from controller 58, as illustrated by operation 310 in FIG. 3. This may result in buffer memory 130 initially storing the I/O request and/or data. After mass storage device 29A has been de-coupled from interface 120A, control circuitry 150 may signal buffer memory 130 and power control circuitry 170 in the manner described previously. This may result in buffer memory 130 continuing to store the I/O request and/or data, as well as, any additional commands (such as, additional I/O requests) that it may receive thereafter that are intended for receipt by decoupled mass storage device 29A, and also may result in power control circuitry 170 shutting off the supply of actuating electrical power from power system 90 to mass storage device 29, as illustrated by operation 312 in FIG. 3.

Alternatively, or additionally, as is also illustrated by operation 312, if, as a result of operation 306, mass storage device 29B is coupled to interface 120B, the signaling of power control circuitry 170 and buffer memory 130 by control circuitry 150 may result both in power control circuitry 170 initiating supply of actuating electrical power to mass storage device 29B, and in buffer memory 130 transmitting to mass storage device 29B the stored (and any subsequently received) I/O request(s) and/or data intended for receipt by de-coupled mass storage device 29A. Thus, mass storage device 29B may act as a replacement for mass storage device 29A in the event of, for example, a failure of mass storage device 29A. After mass storage device 29B has been coupled to interface 120B, control circuitry 150 and/or RAID processing circuitry comprised in RAID 29 may signal the mass storage devices remaining in RAID 29 to implement one or more conventional RAID techniques to rebuild in mass storage device 29B data stored in mass storage device 29A prior to de-coupling of mass storage device 29A from interface 120A. Alternatively, or in addition thereto, host processor 12 may signal ICH 42 to exchange data and/or commands with mass storage 28 that, when executed by mass storage 28, may result in rebuilding in mass storage device 29B data stored in mass storage device 29A prior to de-coupling of mass storage device 29A from interface 120A. After this data has been rebuilt in mass storage device 29B and mass storage device 29B has executed the I/O request(s) and/or stored the data transmitted to it by buffer 130, buffer memory 130 may permit the mass storage device 29B to exchange data and/or commands with ICH 42.

Further alternatively, after mass storage device 29A has been de-coupled from interface 120A, a new replacement mass storage device (not shown) may be inserted into and coupled to interface 120A, and also may be coupled to control circuitry 150. This may result in detection circuitry 160 detecting that this new mass storage device has been coupled to interface 120A. As a result, circuitry 160 may signal control circuitry 150. This may result in control circuitry 150 signaling power control circuitry 170 and buffer memory 130. This may result both in power control circuitry 170 initiating supply of actuating electrical power to this new replacement mass storage device, and in buffer memory 130 transmitting to this new replacement mass storage device the stored (and any subsequently received) I/O request(s) and/or data intended for receipt by de-coupled mass storage device 29A stored in buffer memory 130. After this new mass storage device has been coupled to interface 120A, control circuitry 150 and/or RAID processing circuitry comprised in RAID 29 may signal the mass storage devices remaining in RAID 29 to implement one or more conventional RAID techniques to rebuild in this new mass storage device data stored in mass storage device 29A prior to de-coupling of mass storage device 29A from interface 120A. Alternatively, or in addition thereto, host processor 12 may signal ICH 42 to exchange data and/or commands with mass storage 28 that, when executed by mass storage 28, may result in rebuilding in this new mass storage device data stored in mass storage device 29A prior to de-coupling of mass storage device 29A from interface 120A. After this data has been rebuilt in the new mass storage device and the new mass storage device has executed the I/O request(s) and/or stored the data transmitted to it by buffer 130, buffer memory 130 may permit the new mass storage device to exchange data and/or commands with ICH 42.

Of course, the number and type of mass storage devices that may be comprised in RAID 29, and/or the numbers and types of buses 80 and 22 and links 85 to which ICH 42 may be coupled and via which ICH 42 may exchange data and/or commands, as shown and described herein, are merely illustrative, and may vary without departing from this embodiment. Thus, for example, although the mass storage devices comprised in RAID 29 may comprise integrated drive electronics (IDE) disk mass storage devices that may exchange data and/or commands with controller 58 in accordance with the protocol described in the ATA standard, alternatively, mass storage devices 29A, 29B, . . . 29N may comprises other types of mass storage devices without departing from this embodiment.

Also, without departing from this embodiment, as an alternative or in addition to the construction of buffer memory 130 described previously, buffer memory 130 may comprise one or more tri-state buffers (not shown) associated with and coupled to interfaces 120A, 120B, . . . 120N. These one or more tri-state buffers may be controlled by control circuitry 150, such that when detection circuitry 160 signals control circuitry 150 that a respective one of the mass storage devices 29A, 29B, . . . 29N has been coupled to a respective one of the interfaces 120A, 120B, . . . 120N, buffer memory 130 may couple links 85 to the respective one of the interfaces 120A, 120B, . . . 120N to which that respective one of the mass storage devices 29A, 29B, . . . 29N is coupled. Conversely, these one or more tri-state buffers also may be controlled by control circuitry 150 such that, when detection circuitry 160 signals control circuitry 150 that a respective one of the mass storage devices 29A, 29B, . . . 29N has been de-coupled from a respective one of the interfaces 120A, 120B, . . . 120N, buffer memory 130 may de-couple links 85 from the respective one of the interfaces 120A, 120B, . . . 120N from which this respective one of the mass storage devices 29A, 29B, . . . 29N has been de-coupled.

Also, without departing from this embodiment, although control circuitry 150 has been described as comprising memory 151, control circuitry 150 may not comprise memory 151. In this alternative arrangement, control circuitry 150 may comprise, for example, a state machine and/or other circuitry and/or logic that may carry out and/or perform the functions and/or operations described herein as being carried out by control circuitry 150.

Thus, in summary, one system embodiment may comprise a motherboard comprising a first bus, a second bus, and an IC coupled to the first bus and to the second bus. This system embodiment also may include a storage subsystem capable of being coupled to and controlled by an I/O controller integrated in the IC. The storage subsystem also may be capable of being coupled to and de-coupled from at least one removable storage device, and of receiving from the IC, when the storage subsystem is coupled to the IC, data and/or an input/output (I/O) request. While the removable storage device is being coupled to or de-coupled from the storage subsystem, the storage subsystem may remain capable of receiving from the IC the data and/or I/O request.

Thus, in this system embodiment, the mass storage system may not be coupled to and/or controlled by an I/O controller that is comprised in a circuit card coupled, via an I/O bus card slot in the host system, to a shared I/O bus comprised in the host system. Advantageously, this may increase the number of I/O bus slots, the I/O bus addresses, and/or the I/O bus bandwidth that may be available for use and/or assignment in this system embodiment.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents.

What is claimed is:

1. A method comprising:
coupling an integrated circuit chip to a storage system, the integrated circuit chip including an integrated input/output (I/O) controller, the integrated circuit chip being coupled to a host processor system bus via a dedicated communication path, the storage system being capable of being coupled to and de-coupled from at least one removable storage device, the storage system being capable of receiving from the integrated circuit chip, when the storage system is coupled to the integrated circuit chip, at least one of data and an I/O request; and
one of coupling the at least one removable storage device to and de-coupling the at least one removable storage device from the storage system, the storage system remaining capable of receiving from the integrated circuit chip the at least one of the data and the I/O request while the at least one removable storage device is being one of coupled to and de-coupled from the storage system.

2. The method of claim 1, wherein:
the dedicated communication path permits communication exclusively between the integrated circuit chip and the host processor system bus; and
a memory hub controller comprises the host processor system bus.

3. The method of claim 1, wherein:
the host processor system bus is coupled to system memory and a host processor.

4. The method of claim 1, further comprising:
the integrated circuit chip is coupled to a plurality of other buses.

5. The method of claim 4, wherein:
the plurality of other buses comprises a Universal Serial Bus and a Peripheral Component Interconnect Bus.

6. The method of claim 1, further comprising:
detecting when the at least one storage device is coupled to and de-coupled from the storage system.

7. The method of claim 1, wherein:
a motherboard comprises the integrated circuit chip.

8. An apparatus comprising:
a storage system capable of being coupled to an integrated circuit chip, the integrated circuit chip including an integrated input/output (I/O) controller, the integrated circuit chip being coupled to a host processor system bus via a dedicated communication path, the storage system also being capable of being coupled to and de-coupled from at least one removable storage device, and of receiving from the integrated circuit chip, when the storage system is coupled to the integrated circuit, at least one of data and an I/O request; and
while the at least one removable storage device is one of coupled to and de-coupled from the storage system, the storage system remains capable of receiving from the integrated circuit chip the at least one of the data and the I/O request.

9. The apparatus of claim 8, wherein:
the dedicated communication path permits communication exclusively between the integrated circuit chip and the host processor system bus; and
a memory hub controller comprises the host processor system bus.

10. The apparatus of claim 8, wherein:
the host processor system bus is coupled to system memory and a host processor.

11. The apparatus of claim 8, wherein:
the integrated circuit chip is also capable of being coupled to a plurality of other buses.

12. The apparatus of claim 11, wherein:
the plurality of other buses comprises a Universal Serial Bus and a Peripheral Component Interconnect Bus.

13. The apparatus of claim 8, wherein:
the storage system is also capable of detecting when the at least one storage device is coupled to and de-coupled from the storage system.

14. The apparatus of claim 8, wherein:
a motherboard comprises the integrated circuit chip.

15. An article comprising:
a storage medium storing instructions that when executed by a machine result in the following:
receiving, by a storage system from an integrated circuit chip, while the integrated circuit chip is coupled to the storage system and also while at least one removable storage device is being one of coupled to and de-coupled from the storage system, at least one of data and an I/O request, the integrated circuit chip including an integrated input/output (I/O) controller, the integrated circuit chip being coupled to a host processor system bus via a dedicated communication path, the storage system being capable of being coupled to and de-coupled from the at least one removable storage device.

16. The article of claim 15, wherein:
the dedicated communication path permits communication exclusively between the integrated circuit chip and the host processor system bus; and a memory hub controller comprises the host processor system bus.

17. The article of claim 15, wherein:

the host processor system bus is coupled to system memory and a host processor.

18. The article of claim 15, wherein:

the integrated circuit chip is also capable of being coupled to a plurality of other buses.

19. The article of claim 18, wherein:

the plurality of other buses comprises a Universal Serial Bus and a Peripheral Component Interconnect Bus.

20. The article of claim 15, wherein the instructions when executed by the machine also result in:

detecting when the at least one storage device is coupled to and de-coupled from the storage system.

21. The article of claim 15, wherein:

a motherboard comprises the integrated circuit chip.

22. A system comprising:

a motherboard comprising a first bus, a second bus, and an integrated circuit chip coupled to the first bus and to the second bus; and a storage subsystem capable of being coupled to the integrated circuit chip, capable of being coupled to and de-coupled from at least one removable storage device, and capable of receiving from the integrated circuit chip, when the storage subsystem is coupled to the integrated circuit chip, at least one of data and an input/output (I/O) request, and while the at least one removable storage device is one of coupled to and de-coupled from the storage subsystem, the storage subsystem remains capable of receiving from the integrated circuit chip the at least one of the data and the I/O request.

23. The system of claim 22, wherein:

the motherboard also includes a power system to provide electrical power to the storage subsystem.

24. The system of claim 23, wherein:

the storage subsystem comprises a back plane that is capable of being coupled to the power system.

25. The system of claim 24, wherein:

the back plane comprises circuitry to detect when the at least one storage device is coupled to and de-coupled from the storage subsystem.

26. The system of claim 25, wherein:

the back plane also comprises at least one interface that is capable of being coupled to the at least one storage device.

27. The system of claim 25, wherein:

the back plane also includes buffer memory that is capable of being coupled to the integrated circuit chip.

28. The system of claim 22, wherein:

the first bus is coupled to a host processor; and the second bus comprises one or more bus interface slots.

* * * * *